Figure 1:
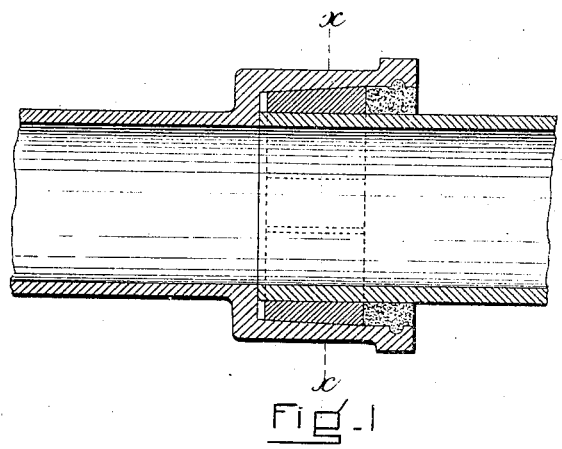

No. 766,006. PATENTED JULY 26, 1904.
H. C. WEEDEN.
PIPE JOINT.
APPLICATION FILED APR. 8, 1903.
NO MODEL. 2 SHEETS—SHEET 1.

WITNESSES: Ellen B. Tomlinson. Jeremiah Toomey.

INVENTOR: Henry C. Weeden by Alex P. Browne, attorney

No. 766,006. PATENTED JULY 26, 1904.
H. C. WEEDEN.
PIPE JOINT.
APPLICATION FILED APR. 8, 1903.
NO MODEL. 2 SHEETS—SHEET 2.

No. 766,006.

Patented July 26, 1904.

UNITED STATES PATENT OFFICE.

HENRY C. WEEDEN, OF BOSTON, MASSACHUSETTS.

PIPE-JOINT.

SPECIFICATION forming part of Letters Patent No. 766,006, dated July 26, 1904.

Application filed April 8, 1903. Serial No. 151,604. (No model.)

*To all whom it may concern:*

Be it known that I, HENRY C. WEEDEN, a citizen of the United States, and a resident of Boston, in the county of Suffolk and State of Massachusetts, have invented certain new and useful Improvements in Pipe-Joints, of which the following is a specification.

My invention relates to improvements in pipe-joints, and it is especially adapted for improvements in the construction of joints in systems of piping of unusual length and weight, such as are met with in the construction of high buildings and other such structures. It has been found in practice that in those systems of piping in which wrought-iron pipe is used there is a certain lack of durability, which involves considerable expense in maintenance and repairs, especially where such pipe is used as soil-pipe. Furthermore, it has been found in the case of the ordinary cast-iron soil-pipe, and especially when used in long runs, that the expansion and contraction of the iron being different from that of the lead calking the joint gradually becomes loose. The difference in temperature is caused in some cases by the running alternately of hot and cold water through the system and also to some extent by the variations of natural temperature.

By my present improvement I make use of cast-iron pipe, which may be tarred, painted, or enameled, and I dispense with lead as a necessary element of the joint.

In the accompanying drawings I have shown at Figure 1 in vertical section a pipe-joint embodying my present improvement, at Fig. 2 a transverse section on the line *x x* of Fig. 1, and at Fig. 3 one form of the self-locking thimble hereinafter described. At Figs. 4, 5, and 6 I have shown in similar manner a modification of the joint, in which the thimble is formed in four pieces instead of two.

In carrying out my invention I introduce the spigot end of one length of pipe, which I will speak of hereinafter as the "spigot" member, into the hub end of another length of pipe, which I will speak of hereinafter as the "hub" member, the object of my improvement being to provide a tight and permanent joint between these two. I accomplish this by introducing into the hub of the hub member in the space between its inner wall and the outer wall of the spigot member a self contracting and locking device. This device is a sectional ring having its external periphery tapered, as shown at Fig. 1, to correspond with the tapered internal wall of the hub. (Shown in Fig. 1.) Further, the meeting faces of the sections C C' of the ring are preferably beveled, as shown. By this construction an automatic wedge action of the rings is obtained when they are driven home by force applied in any desired manner, and this wedge action firmly locks the spigot and hub members together. Any vacant space, such as that indicated in Fig. 2, which may be left between the two contacting ends of the two half-rings may now be filled by pouring in liquid asphaltum or other suitable cement, and the space within the hub member, above or outside of the locking device, may also be filled with any suitable cement.

Figure 2:
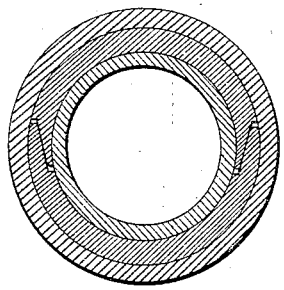
Figure 4:
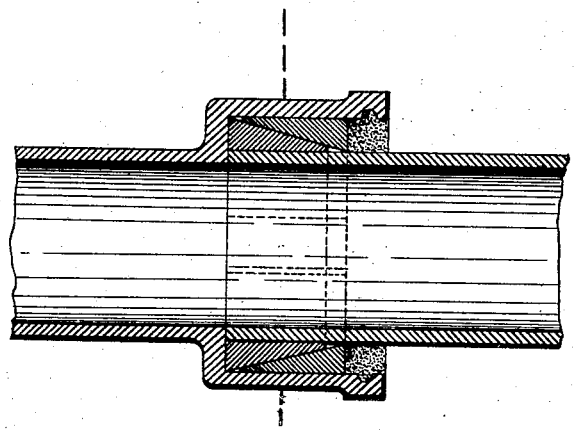
Figure 5:
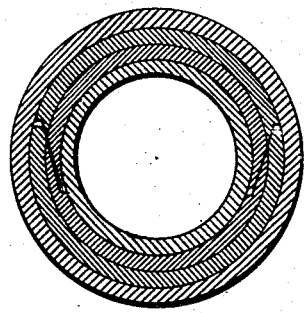
Figure 6:
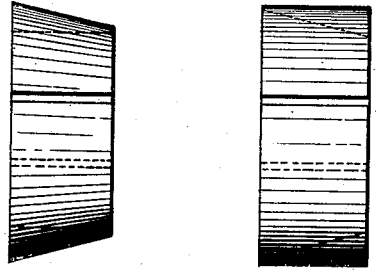

In the modification shown at Figs. 4 to 6 I have represented the interior walls of the hub member as straight as distinguished from the tapering wall of Fig. 1, and a wedge action of the locking-ring is accomplished by having each portion composed of two parts the opposed faces of which are made tapering, as shown at Figs. 4 and 6.

It will be understood that the packing or filling rings are to be of such diameter and thickness as to exactly fill the space between the hub and spigot to which they are applied, whereby the oppositely-beveled meeting ends of the several sections of such rings will be in contact throughout their length. Any expansion of the joint will act to force said meeting ends closer together, and as the hub is composed of the same material as the packing-rings its walls will be expanded to the same extent as the said packing, and therefore the said oppositely-beveled ends of the ring-sections will be continuously maintained in contact and the tightness of the joint maintained at all times.

Figure 3:
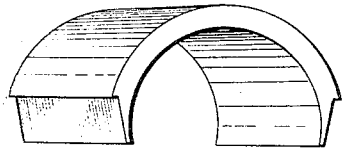
Figure 3:
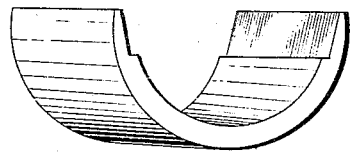

In view of the fact that the metal of which the self-locking ring or rings is composed may have a certain amount of spring I consider it obvious that these rings might be cut at one point only instead of at two points, as shown in Figs. 3 and 6.

I claim—

1. A pipe-joint consisting of a hub member, a spigot member of exterior diameter less than the interior diameter of said hub and inserted therein, and an intermedially-disposed plurality of wedge-formed segments peripherally arranged in the same horizontal plane in the space between said spigot and said hub, and collectively permanently locking said hub and spigot members together.

2. A pipe-joint consisting of a hub member, a spigot member of less diameter than said hub and inserted therein, and an intermedially-disposed plurality of wedge-formed segments peripherally arranged about the spigot in the same horizontal plane and collectively permanently locking said hub and spigot members together, said segments being located wholly below the rim of said hub.

3. A pipe-joint consisting of a hub member, a spigot member of less diameter than said hub and inserted therein, and an intermediately-disposed plurality of wedge-formed sections peripherally arranged about the spigot and collectively permanently locking said hub and spigot members together, the meeting edges of adjacent sections overlapping.

4. A pipe-joint consisting of a hub member, a spigot member inserted in said hub, and a packing or filling comprising a plurality of wedge-formed sections driven into the space between the hub and spigot therein, the meeting ends of adjacent sections being oppositely tapered or beveled.

5. A pipe-joint consisting of a hub member, a spigot member inserted therein, and two intermediately-disposed calking-rings, each formed in sections having tapering meeting sides.

6. A pipe-joint consisting of a hub member, a spigot member inserted therein, and two intermediately-disposed calking-rings, each formed in sections having tapering meeting sides and tapering meeting ends.

7. A pipe-joint consisting of a hub member, a spigot member inserted therein, and two intermediately-disposed calking-rings cut at one or more points, and having tapering meeting sides.

8. A pipe-joint consisting of a hub member, a spigot member inserted therein, and two intermediately-disposed calking-rings cut at one or more points, and having tapering meeting sides and tapering meeting faces at the point or points of section.

In testimony whereof I have hereunto subscribed my name this 3d day of April, 1903.

HENRY C. WEEDEN.

Witnesses:
  ALEX. P. BROWNE,
  ELLEN B. TOMLINSON.